(12) United States Patent
Aggarwal et al.

(10) Patent No.: US 6,876,643 B1
(45) Date of Patent: Apr. 5, 2005

(54) CLUSTERING IN WIRELESS AD HOC NETWORKS

(75) Inventors: Alok Aggarwal, Chappaqua, NY (US);
Manika Kapoor, Delhi (IN);
Abhinanda Sarkar, New Delhi (IN);
Lakshmi Ramachandran, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 697 days.

(21) Appl. No.: 09/634,123

(22) Filed: Aug. 8, 2000

(51) Int. Cl.[7] ............................................... H04Q 7/24
(52) U.S. Cl. ........................................ 370/338; 370/254
(58) Field of Search ................................ 370/338, 913, 370/328, 254, 255, 449, 457

(56) References Cited

U.S. PATENT DOCUMENTS

| | | | |
|---|---|---|---|
| 5,574,860 A * | 11/1996 | Perlman et al. ............... 709/220 |
| 5,946,317 A * | 8/1999 | Parkhideh .................... 370/410 |
| 6,192,397 B1 * | 2/2001 | Thompson .................. 709/209 |
| 6,243,771 B1 * | 6/2001 | Van Gasteren et al. ....... 710/59 |
| 6,275,500 B1 * | 8/2001 | Callaway et al. ............ 370/449 |
| 6,304,556 B1 * | 10/2001 | Haas ............................ 370/254 |
| 6,331,986 B1 * | 12/2001 | Mitra et al. ................. 370/468 |
| 6,381,467 B1 * | 4/2002 | Hill et al. ................... 455/519 |
| 6,513,082 B1 * | 1/2003 | Fischer et al. ............... 710/113 |
| 6,535,498 B1 * | 3/2003 | Larsson et al. .............. 370/338 |
| 6,570,857 B1 * | 5/2003 | Haartsen et al. ............. 370/312 |
| 6,587,455 B1 * | 7/2003 | Ray et al. .................... 370/352 |
| 6,590,928 B1 * | 7/2003 | Haartsen .................... 375/134 |
| 6,636,499 B1 * | 10/2003 | Dowling ..................... 370/338 |
| 6,640,268 B1 * | 10/2003 | Kumar ........................ 710/46 |
| 2002/0018458 A1 * | 2/2002 | Aiello et al. ................ 370/348 |
| 2002/0059434 A1 * | 5/2002 | Karaoguz et al. ........... 709/228 |

* cited by examiner

Primary Examiner—Frank Duong
Assistant Examiner—Michael J. Moore, Jr.
(74) Attorney, Agent, or Firm—McGinn & Gibb, PLLC; T. Rao Coca, Esq.

(57) ABSTRACT

A method, system, and computer program product for organizing a set of nodes into a minimum number of connected clusters of bounded size in a wireless transmission system, wherein the method comprises using of bits in packets used in the initial stages of the device discovery procedure, to include information relating to a state of device discovery to achieve the separation of the nodes into those in the transmit-state and the receive-state; defining a Master-designate among the nodes through a statistical procedure and defining remaining nodes as a Slave-designate; defining a cluster including the Master-designate and at least one the Slave-designate, wherein the Slave-designate continuously scans for the inquiry message transmitted from the Master-designate and the Slave-designate transmits the inquiry response to the Master-designate.

22 Claims, 12 Drawing Sheets

Randomized cluster formation algorithm for X=k

Algorithm executed by a Master-designate:
*if* ( node is a Master-designate *or* Master ) *then*
    state = INQUIRY;
    number_of_responses =0;
    number_of_masters=0;
    response_list = nil;
    *while* ( CLUSTER_TO is not reached *or* SUPERM_TO is not reached )
        broadcast Inquiry packet;
        *if* ( node is Master-designate *and* response is received from Slave_designate)
*then*
            number_of_responses++;
        add Id and Clock of sender to response_list;
page the slave and connect to it;
        *if* ( number_of_responses == 1 *and* node has become Master-designate by
stage-1) *then*
            page the slave, connect to it and ask it to become a Proxy-slave;
        *if* ( number_of_responses == S ) *then* Node becomes Master;
      *else if* ( response is received from Proxy-slave ) *then*
        number_of_masters++;
        *if* ( CLUSTER_TO occurs *and* (number_of_masters == k *or*
        SUPERM_TO occurs) and node has become Master-designate by stage-1)
*then*
            node becomes Super-master-designate;
            informs Proxy-slave;
        *if* ( node has not become Master-designate by stage-1 *and* CLUSTER_TO
occurs ) *then*
            *Break*;
        *if* ( CLUSTER_TO occurs *and* number_of_responses == 0 ) *then*
            // node becomes Slave-designate
    *endwhile*
*endif*

Fig. 2

Algorithm executed by a Slave-designate:

*if* ( node is a Slave_designate ) *then* state = INQUIRY_SCAN;

*while* ( node is a Slave-designate )

*if* ( Inquiry packet is received ) *then* send Inquiry_response packet ;

state = PAGE_SCAN;

*if* ( Page packet is received immediately) *then* complete connection establishment;

state = CONNECTED;

Node becomes Slave;

*if* ( Master asks it to become Proxy_slave ) then node becomes Proxy-slave;

*else* // it is not paged state = INQUIRY_SCAN;

*endwhile*

*endif*

Fig. 4

Algorithm executed by a Proxy-slave:

*if* ( node is a Proxy-slave ) *then*

// node knows Master ID

// this node is in CONNECTED state

*while* ( Super-master-elected message is not received )

periodically move between INQUIRY_SCAN and CONNECTED states;

// the amount of time in inq-scan being much more than that in connected

*if* ( Inquiry packet is received ) *then*

// state is in INQUIRY_SCAN reply with Inquiry_response packet with the Slave-bit set;

go to PAGE_SCAN state to see if page connection is requested;

if no Page msg is received, go back to INQUIRY_SCAN state;

*if* ( updated cluster-status information is received from Master ) *then* update cluster-information;

*if* ( super-master-designate asks for cluster information ) *then*

// temporarily becomes a bridge between its own cluster

// and that between itself and the Super-master-designate send cluster information required by the Super-master-designate;

*endwhile*

// super-master election is complete state = CONNECTED;

*endif*

Fig. 6

```
Algorithm executed for Super-master-election:
if ( node is a Super-master-designate ) then
    while ( node is Super-master-designate )
        collect cluster information from all the Proxy-slaves which responded;
        // in order to make a connection to a Proxy-slave, send Inquiry pkt, so
that it goes to
        // page-scan soon after responding and connection can be established.
        if ( number_of_masters < k ) then
            // SUPERM_TO has occurred
            make a connection to the Proxy-slave with the highest Id
            node becomes Super-master;
            break;
        // number of masters = k ( actual number-of-masters > k )
        if ( total number of known nodes in k clusters == N ) then // X = k
            break;
            if ( total number of known nodes in k clusters < N ) then // X > k
            if ( new Proxy-slaves respond to Inquiry packets ) then
            number_of_masters++ ;
            collect cluster info. from them;
            if ( total number of known nodes == N ) then
                node asks the highest Id Master to become Super-master;
                also tells the Super-master to terminate;
                Gives the Super-master all X Master Ids;
    endwhile
    if ( node has been asked by a Proxy-slave to become Super-master and
        all N nodes not known ) then // X < k
        while( all N nodes are not known )
            if ( k-X <= S ) then
                Make all k-X slaves new Masters, which then collect the remaining
nodes;
            else
                Make S slaves new Masters, which collect new Slave-designates
                The first k-X-S Slave-designates that reply to it are made Masters;
                if ( new Slave-designates respond to Inquiry packets ) then
                    // these are orphan slave-designates which are not part of any
cluster
                    if ( the node*s cluster has < S slaves ) then
                        add new slave to cluster as if Master-designate ;
                    else
                        add to separate list of additional slaves ;
        endwhile
        if ( number_of_clusters > k ) then
            Tear down excess clusters and distribute the nodes among k clusters;
            connect the clusters to form a desired topology by deciding the
            bridges and neighbouring clusters for every Master, and informing the
            nodes;
        send termination message to all clusters ( and hence all nodes );
endif
```

*Fig. 9*

Randomized cluster formation algorithm for X<k

Randomized cluster formation algorithm for X=k

Randomized cluster formation algorithm for X>k

CLUSTERING IN WIRELESS AD HOC NETWORKS

FIELD OF INVENTION

The invention relates to a method, a system, and a computer program product for formation of a set of connected clusters of bounded size in a distributed fashion.

BACKGROUND OF INVENTION

Recently, the Bluetooth system, which is a unique technique for short range wireless transmission with low cost, is interesting because of its availability and data transmission speed. The Bluetooth system may connect discrete mobile devices such as a cellular phone, a note-type personal computer etc. using a 2.45 GHz ISM band. In the Bluetooth system, there is a problem of distributed cluster formation in an ad hoc wireless environment.

Bluetooth an asynchronous system, in which each node, (i.e. device included in the system) has a unique ID but does not know the ID of any other node. In conventional systems, each node advertises its node-ID to announce its presence to other nodes in the vicinity. However in Bluetooth each node trying to discover other nodes broadcasts a generic message and does not send its ID in the message. The replying node gives its ID in the reply message, however the replying node does not know which node it is replying to. This situation often causes limitation of amounts of information to be transmitted between the nodes. This, in turn; limits the performance of the Bluetooth System.

DISCLOSURE OF PRIOR ART

Several methods have previously been proposed as conventional techniques. U.S. Pat. No. 5,850,592, entitled "Method for self-organizing wireless station network", discloses a group of wireless devices that automatically organizes or configures itself into a multi-layered network for relaying messages from station to station, with some of the stations operating at a relatively high power level is message gateways for a cluster of stations operating at lower power, thereby forming a network backbone providing longer distance network links through the gateways.

US. Pat. No. 6,026,297, entitled "Contemporaneous connectivity to multiple piconets", discloses techniques for enabling wireless units to contemporaneously participate in communications taking place in more than on a piconet at a time.

U.S. Pat. No. 5,652,841, entitled "Method and apparatus for aggregating terminals into clusters to assist in the construction of a distributed data communication network", discloses a method and apparatus for aggregating terminals into clusters that assists in the construction of a distributed data communication network. In U.S. Pat. No. 5,652,841, the terminal locations to be clustered are used as an input along with a weight for each one, where this weight represents the traffic carried by that location.

U.S. Pat. No. 6,026,303, entitled "Method for determining optimal parent terminal and ad hoc network system for the same", discloses the system, in which at least one of a plurality of wireless terminals of a network is selected as a current temporary parent wireless terminal, all of the plurality of wireless terminals other than the current temporary parent wireless terminal being set as child wireless terminals. Subsequently, a set of state determination data are collected from each of the child wireless terminals by the current temporary parent wireless terminal. The state determination data includes at least one of a wireless terminal state data for each of the child wireless terminals and a communication state data for each of the child wireless terminals. Then, it is possible to determine whether or not the collecting operation is executed in K cycles, where K is a positive integer.

U.S. Pat. No. 6,014,406, entitled "Frequency-hopped wireless communication system and mobile wireless terminal" discloses a frequency-hopped mobile communication system in which a mobile wireless station automatically becomes a base station in accordance with the surrounding conditions, thereby automatically reconfiguring a communication network. In U.S. Pat. No. 6,014,406, a control frame is generated by at least one master station, and frequencies are hopped by a plurality of slave stations in accordance with the control frame. Each slave station switches the master thereof to be tracked in accordance with the receiving conditions of the control frame and the relation between the control frame received from the master station and the status of the slave stations and decides in which modes, master station or slave station, the slave station is to operate. The cells are thus automatically reconfigured.

There are some other prior arts relating to the Bluetooth system such as H. H. Abu Amara and J. Lokhre discloses in "Election in asynchronous complete networks with intermittent link failures," IEEE Trans. Computers, vol. 43, no. 7, pp. 778–788, July 1994; T. Hayashi, K. Nikon and S. Orally, "Randomized initialization protocols for packet radio networks," 13th Int. Parallel Processing SMP. And 10th Symposium on Parallel and Distributed Processing, 1999; and Woo and H. Li, "On calculating connected dominating set for efficient routing in ad hoc wireless networks," DIAL M, '99, Copyright ACM.

Whereas the above conventional arts have been proposed, there are continuous needs to provide a method, a system and a program product for efficiently organizing devices in a wireless transmission system into bounded size clusters in a short amount of time.

SUMMARY OF INVENTION

The present invention has been made essentially bused on the following ideas:
a) obtaining some information about the state of the device in the device discovery messages is more time efficient than setting up a connection with the devices to obtain such information, and that
b) In the case when the devices need to discover the identity of other devices in vicinity, the process to form a wireless network will take less time when one set of these devices bus the job of only transmitting the inquiry message mid the rest of the devices have the job of only listening out for any such messages end sending responses to them. Also, the entire clustering process will take lesser time when the devices carry out the tusk of transmitting inquiry messages and the task of listening for these inquiry messages continuously instead of intermittently. We will refer to the devices transmitting the inquiry messages us devices being in the transmit-state and the devices listening out for these messages as devices being in the receive-state. In Bluetooth these states correspond to Inquiry and Inquiry-scan states respectively.

The present invention has been made essentially based on the idea that once a device has discovered another device, much more information can be transmitted between them with relatively less overhead. The present invention may be applied to any wireless transmission system, however, the present invention is particulary suited for frequency hopping systems, where the devices hop on a sequence of frequencies, and the messages are repeatedly broadcast in order to reach other nodes. In addition, the present invention may be particularly suitable to a specific wireless transmission system called Bluetooth System. The Bluetooth standard defines 'inquiry' procedures, which are used by devices to discover each other. A device can be in 'inquiry' mode or 'scan' mode, which correspond to the said transmit and receive states respectively. The devices can possibly alternate between the two modes, but a device can be only in one of these modes at a time. A few undefined bits are present in the packets used for inquiry or response. These undefined bits are used to send additional information from the responding device to the inquiring device.

For any two devices to exchange large amounts of information, connection has to be established between them. The Bluetooth network unit corresponding to a cluster is called a 'piconet' and a set of piconets is called a 'scatternet'. Clusterheads are synonymous with Bluetooth Master devices and non-clusterheads with Bluetooth Slave devices.

An object of the present invention is to provide a method for a set of nodes to efficiently self-organize into a minimum number of connected clusters of bounded size, each cluster having a clusterhead, i.e., Master-designate or Master; each node also knows which node is its Master. The present invention may have wide applicability in wireless communication systems, however, the present invention is particularly suited for a specific wireless technology called as Bluetooth.

An object of the present invention is also to provide a system implementing a method according to the present invention.

An object of the present invention is also to provide a computer program product for executing the method according to the present invention.

An essential feature of the present invention is to use two techniques to speed up the process of network formation. These techniques would have to be used by any method which aims at distributed network formation, while avoiding the redistribution of nodes among clusters and role-switches between clusterheads and non-clusterheads. The method according to the present invention also avoids temporary connection establishment between pairs of devices during network formation.

The first technique is the transmission of intermediate state of the system during the network formation, using a few bits of information in the device discovery procedures. The second technique is the setting of some specific parameters to achieve the logical separation of nodes, into those which will continuously be in the transmit-state and those which will continuously be in the receive-state which correspond to Inquiry and Inquiry-scan states of Bluetooth, respectively.

These two techniques greatly speed up the network formation process. Any method which tries to achieve the same purpose would have to use at least one or both of these two specific techniques.

A preferred embodiment of the present invention will be explained using the Bluetooth System as specific examples accompanied with drawings which describe the best mode of the present invention.

BRIEF EXPLANATION OF DRAWINGS

FIG. 2 shown an algorithm executed by a Master-designate.

FIG. 4 shows an algorithm executed by a Slave-designate.

FIG. 6 shows an algorithm executed by a Proxy-slave-designate.

FIG. 9 shows an algorithm executed for Super-Master-Election.

BEST MODE FOR CARRYING OUT INVENTION

Figure 1:
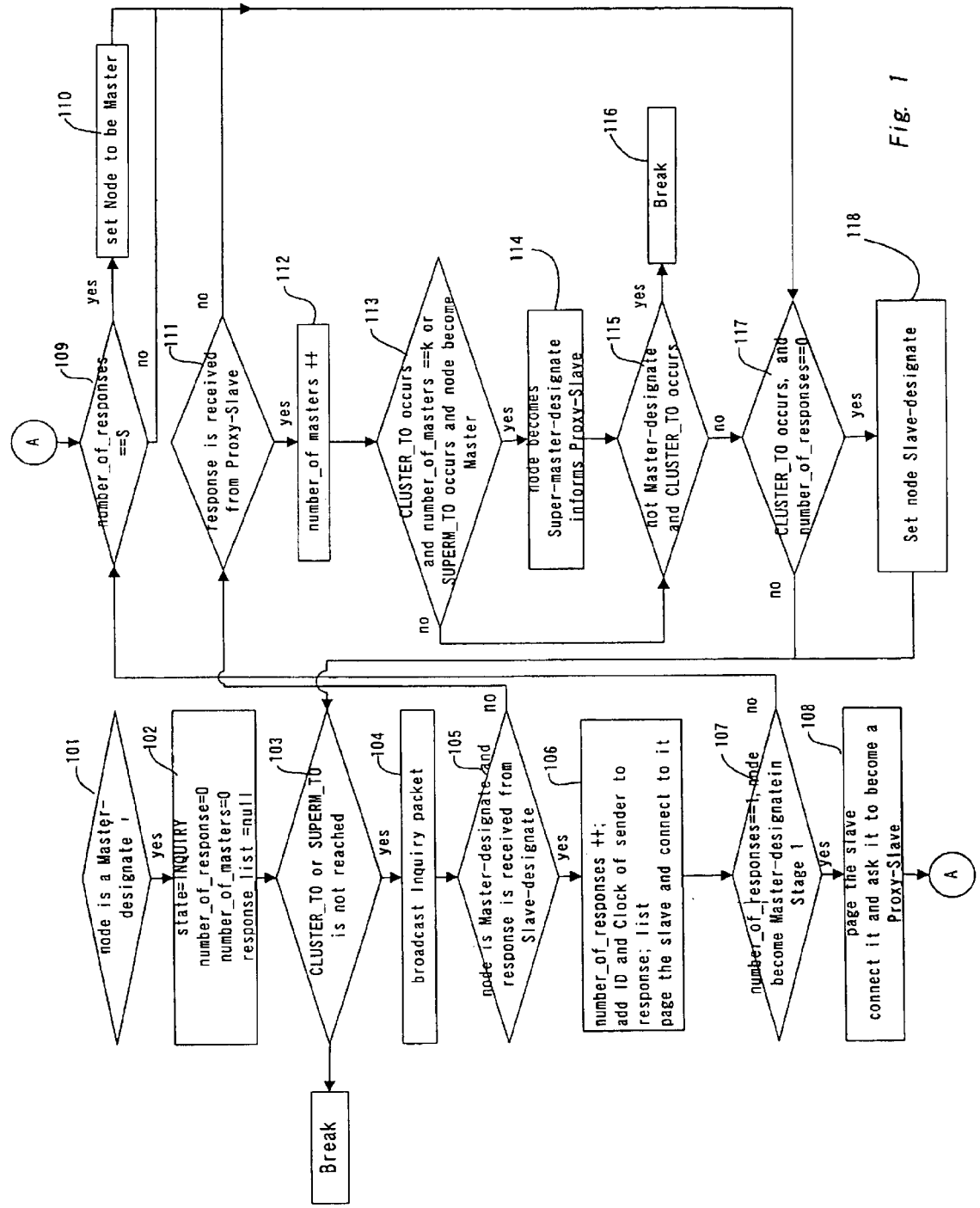
FIG. 1 a flowchart of a process executed in a Master-designate.

As briefly summarized above, the present invention uses two significant techniques. The first technique may be implemented in several ways. For example, the bits may be used to convey how many responses a particular node has received till that point in time. This is applicable when the nodes carry out alternate inquiry and scan, and the device which has collected enough slaves, either directly or indirectly, becomes the clusterhead. These bits may also be used to convey whether the replying node is already part of a cluster or not. These bits may be used for connecting clusters together to form a network, where a node which is already part of a cluster continues to scan or inquire in order to discover other clusters. In another embodiments, the bits may also be used to indicate whether or not the replying node is a clusterhead, i.e., a Master-designate. In further another embodiment, the bits may be used to convey how many clusters the replying node is already a part thereof. The above embodiments are described only as an illustrative purpose, but not limited thereto, the undefined bits may carry any other information necessary for forming the transmission cluster.

The second technique is achieved by setting the value of the Inquiry-scan interval (the period of time between the start of two successive Inquiry-scan periods, referred to as Inquiry-scan-interval in the Bluetooth Standard) close to or equal to the value of the Inquiry-scan window. The closer the value of the scan interval becomes to the value of the scan window, the clustering operation will become faster. For achieving interconnection between piconets, the separation of the inquirers and scanners may be achieved by the delegation of the inquiry end scan procedures to specific Slaves in the piconet. The Master of the piconet may keep the other existing connections from getting uninterrupted.

The present invention also provides a novel method for clustering of the nodes in a wireless transmission system using a two-stage process for topology construction: the first stage is a randomized algorithm which determines the possible clusterheads (or Masters), and the second stage is a deterministic algorithm which is used to fine-tune the result of the first stage and decides on the, non-clusterhead (or Slaves) and bridge nodes.

Model for a Wireless Transmission System

The present invention will be explained using the Bluetooth System as a specific embodiment, however the present invention may be applied to any equivalent wireless transmission system as well. The model is, typically assumed in the present embodiment to be the wireless ad hoc network as an undirected complete graph, where the set of nodes represents the devices in the network. The devices may include mobile devices such as a cellular phones, a note-type computer, but not limited thereto, any other suitable mobile devices may be included in the network. There is an edge between two nodes if they are within radio range of each other. In the present embodiment, further it is assumed that each node has a unique ID known to itself, but not to other nodes. The total number of nodes, N, and the maximum number of nodes that a single cluster may accommodate (excluding the clusterhead), S, are known to all the nodes. The nodes communicate with each other using messages, which are assumed to reach the destination instantaneously if the listener's frequency corresponds to the sender's.

The network is further assumed to be asynchronous, and there is no notion of global time, with each node keeping its own local Clock. It is further assumed that there is no centralized entity which has complete information about the network. All nodes use a common fixed set of frequencies to communicate, and if a message from a node has reached some other nodes, then it is assumed that the reply will also reach the sender. The nodes use a random back-off mechanism before replying so that collisions may be avoided. It should be noted that unlike in other models described in the conventional models, a node broadcasting a message repeatedly does not know that the message has reached another node until it receives the response. Even if a broadcast message originating at a node at a given frequency may not reach any other node, the nodes repeatedly broadcast the same information on various frequencies so that the message may be received by the other nodes.

According to the model on which the present invention is based, each, node may be in one of the following states:

INQUIRY, wherein a device in this state broadcasts Inquiry packets, which do not contain the sender's ID or any other information, except that it is an Inquiry packet.

INQUIRY_SCAN, wherein a, device listens for Inquiry packets and broadcasts an Inquiry_response packet in return. The response packet contains the sender's unique ID and Clock which may be used to determine its frequency at any future instant. A limited amount of information which consisted of at most a few bits can be piggybacked on this packet.

PAGE, wherein a node tries to make a connection to a node whose ID and Clock are known to the device, by sending Page packets, which contain the destination node's ID. When the connection is successful, then this node automatically becomes a Master of the corresponding sender.

PAGE_SCAN, wherein a device listens for a Page packet and acknowledges it on receipt, completing the connection establishment with the node which transmitted the Page packet. If the connection is successful, this node automatically belongs to the clusterhead by the paging node.

CONNECTED, wherein a device is part of a cluster and has a connection established with the clusterhead after a successful handshake as described above.

A node is always in one of the above described states at any given time. Since the nodes are not synchronized, the set of nodes in INQUIRY/INQUIRY_SCAN or PAGE/PAGE_SCAN is random. Clearly, two nodes should be in complementary states to discover each other. The INQUIRY/INQUIRY_SCAN states correspond to the device discovery phase of the connection setup. It is also assumed that connection establishment with a node that has been discovered using the Inquiry packets, is almost instantaneous due to the availability of the Clock information. This means that the Page/Page_response packets are always delivered successfully in the system if transmitted after a successful Inquiry process has been carried out. Any two nodes which are "connected" to each other are always in a Master-Slave configuration in which one of the devices is defined as a Master and the other is defined as a Slave, and any messages can be passed over the link with very little overhead. The system is assumed that any device is equally suited to become a Master or a Slave, and each device is equally likely to request a connection establishment to any of the other devices.

An Algorithm for Cluster Formation

An algorithm of the present invention will be explained herein below. The algorithm according to the present invention comprises two stages for partitioning the set of nodes into a connected set of star-shaped clusters, while keeping the size of the clusters at their maximum. An important idea used in this algorithm is to make a device continuously broadcast or continuously listen in order to increase the probability of the message reaching another device. When all devices alternate between send and listen states, the chances of a frequency match between the nodes becomes less.

The first stage of the algorithm makes randomized nodes to become a Master-designate or a Slave-designate at the end of the first stage. For a network of N nodes and maximum cluster size S, an ideal number of Masters may be calculated to be $k=[N/(S+1)]$. The second stage of the algorithm according to the present invention uses a deterministic algorithm to decide on the final set of Masters and Slaves so as to efficiently assign Slaves to Masters. Thereafter, a Super-master is elected, which is required for counting the actual number of Masters and for collecting information about all the nodes. This second stage also corrects the effect of the randomness introduced in the previous stage. The election of the Super-Master may be interleaved with the cluster formation, thereby enhancing communication speed of the ad hoc network formation. This Super-Master configuration is described in the Bluetooth System in the present embodiment, however, the Super-master architecture may run any centralized algorithm to form a network of desired topology. The algorithm according to the present invention is described in detail as below:

Stage 1: Each of the N nodes conducts several rounds of a Bernoulli trial with P[success]=p. A node which is successful at least once in the Bernoulli trials becomes a Master-designate and the remaining nodes become Slave-designate. The nodes which become the Master-designates go into the Inquiry state and the nodes which become Slave-designate go into the Inquiry scan state. The Bernoulli trials are conducted in each node, and when only one Bernoulli trials succeed in a particular node, the node acts as the Master-designate and goes into the Inquiry state. The above Bernoulli trials may be implemented in the nodes according to any well-known procedure. When all of the Bernoulli trials failed, the node becomes a Slave-designate to start the Inquiry scan. Using known methods, it can be shown that the number of Master-designates would be between 3k/4 and 2k with probability at least $$1 - 2 \cdot \frac{1}{e^{k/4}}.$$

Stage 2: To proceed to stage 2 procedure of the algorithm, the following are further assumed on the various time-out values used by the nodes. These time-out values are the same for all the nodes.

Assumption-1: Each node has a CLUSTER_TO value such that if the node inquires for this period of time, and there are enough number of nodes in its radio range which are scanning for Inquiry packets, then at least S devices will respond to it.

Assumption-2: Each node has a SUPERM_TO value such that a node inquiring for this period receives responses from at least 2k nodes that are scanning. For practical purposes, we assume that P[#Master–designates>2k] is very small, for reasonably large k.

Assumption-3: A set of inquiring nodes receives one scanning node each well before the SUPERM_TO period.

In the following description, the terms "Slave-designate", "Slave", Master-designate", "Master", "Proxy-slave", "Super-master-designate", and "Super-master" are used. The terms have the following meanings.

Slave-designate: a node which did not succeed in any of the Bernoulli trials, and is not yet part of any cluster.

Slave: a Slave-designate which becomes a part of a cluster.

a Master-designate: a node which had a successful Bernoulli trial, and has not yet collected Inquiry responses from enough Slave-designates and has not timed out (CLUSTER_TO).

Master: a node which has collected responses from S Slave-designates or has timed out (CLUSTER_TO).

Proxy-slave: a Slave which has been identified by its Master to participate in the super-master election on its behalf.

Super-master-designate: a Master which has collected k responses from other clusters, or has reached the SUPERM_TO.

Super-master: a Master which has received responses from all other clusters, and has information about all the nodes in the network.

Description of Stage-2 of the Algorithm:

Master-designates and Slave-designates are determined using Stage-1, as described above. Here, X denotes the actual number of Master-designates.

FIG. 1 shows a flowchart of the algorithm executed by a Master-designate. If the node is designated as a Muster-designate in the step 101, the Master designate sets state=INQUIRY, number_of_responses=0, number_of_masters=0, and response_list=null in step 102. In step 103, the algorithm determines whether the Master-designate receives the CLUSTER_TO or SUPERM_TO. If the CLUSTER_TO or SUPERM_TO is not reached (yes) the algorithm starts the Master-designate to broadcast Inquiry packet including the bit carrying the specific information in the step 104. The algorithm proceeds to the step 105 to determine whether or not any response is reached from the Slave designate. When the response is received from a Slave-designate (yes) in the step 105, the algorithm sets number of responses to ++, and adds ID and Clock of sender to response_list in the step 106 and the Master-designate makes the Slave in its cluster by paging and making a connection to it as long as the maximum cluster size is not exceeded. The algorithm next determines in the step 107 if this Slave is the first Slave of the cluster (number_of_responses=1). If so (yes), the Master-designate set the Slave to be a Proxy-slave in the step 108. When this Slave is not the first one (no), then the algorithm proceeds to the step 109 and determines the cluster becomes full. When the cluster becomes full (yes), the Master designate sets itself as Master in the step 110, and any future inquiry responses from Slave-designates are ignored. If not (no), the algorithm next proceeds to the step 111 and determines whether or not the response from the Proxy-Slave is received. When the response from the Proxy-slave is received (yes), the algorithm sets number_of_masters to be ++ in the step 112.

As part of the Super-master election which is interleaved with the cluster formation from the step 113 to the step 117, the algorithm proceeds to the step 113 and determines whether or not CLUSTER_TO occurs; number of masters=–k or SUPERM_TO occurs and node has become the Master. If so (yes), the algorithm proceeds to the step 114 and the Master-designate or Master is set as the Super-master-designate and the information is transmitted to the Proxy-Slave. If not (no), the algorithm further proceeds to the step 115 and determines whether the node has not become Master-designate by stage 1 and CLUSTER_TO occurs. If so (yes), the algorithm proceeds to the step 116 to end. If not (no), the algorithm further determines whether or not CLUSTER_TO occurs and number_of_response is equal to 0 in the step 117 and if not (no) the algorithm goes back the while-loop started from 103. IF so (yes), the algorithm proceeds to the step 118 and set nude as Slave-designate and reverts to the step 103. Namely, in the algorithm from the step 113 to 118, the Master/Master-designate collects up to k responses from Proxy-slaves of other clusters, or times out (SUPERM_TO). At this point, the node declares itself Super-master-designate. However, this happens only after CLUSTER_TO has occurred. If the Master-designate has not collected any responses by the CLUSTER_TO period, then it becomes a Slave-designate and starts scanning. A sample pseudo-code for executing the Master-designate from the step 101 to 115 is shown in FIG. 2.

Figure 3:
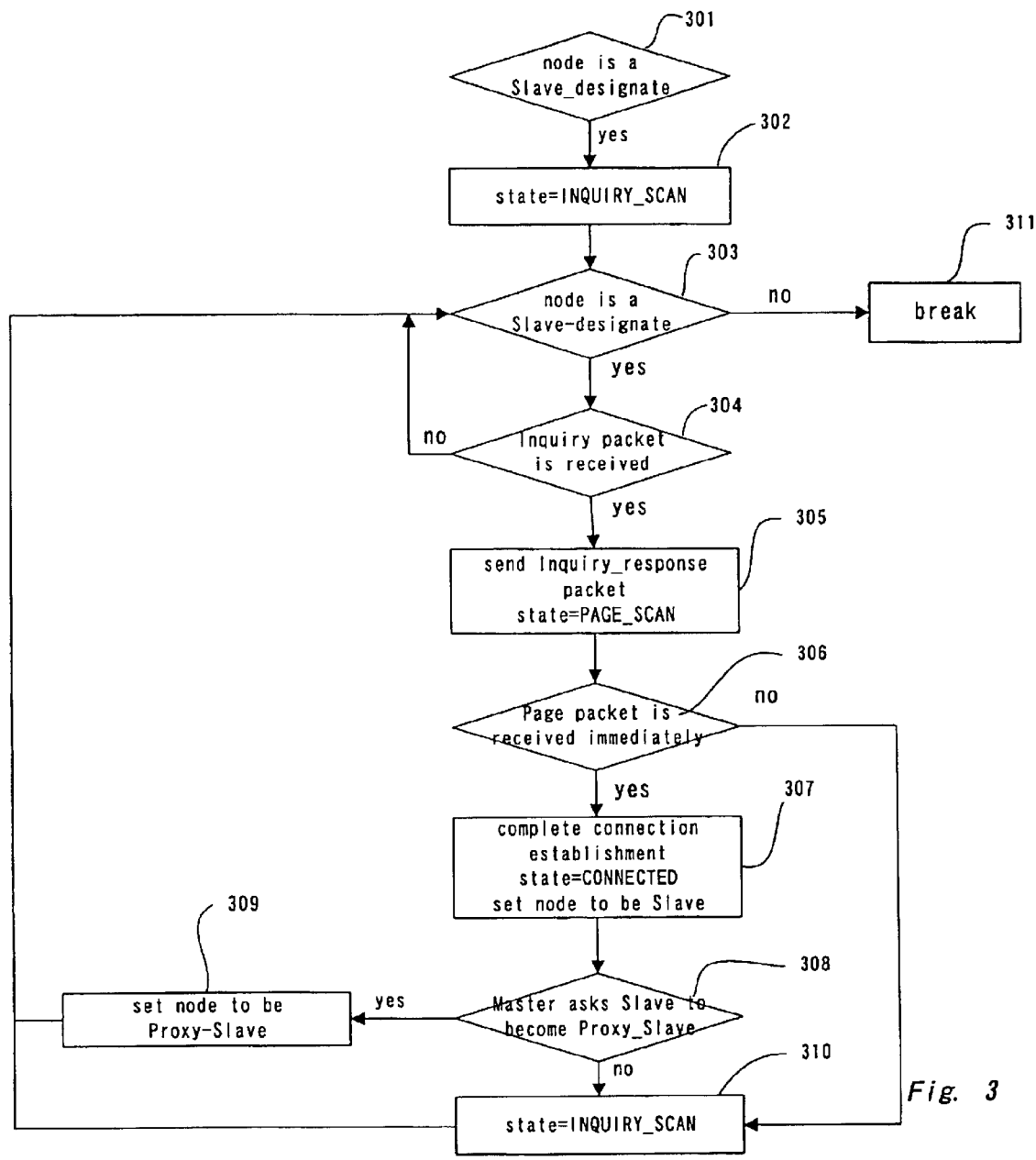
FIG. 3 a flowchart of a process executed in a Slave-designate.

FIG. 3 shows a flowchart of the algorithm executed in the Slave-designate. The algorithm shown in FIG. 3 first determines whether the node is Slave-designate in the step 301. The algorithm then proceeds to the step 302 to set the state=INQUIRY_SCAN and starts the Slave-designate continuously to scan for Inquiry messages. The algorithm proceeds to the while-loop determines whether or not the node is a Slave-designate in the step 303, and if so (yes) the algorithm then proceeds to the step 304 and determines whether Inquiry packets are received. If so (yes), the Slave-designate sends Inquiry_response packet and set state=PAGE_SCAN in the step 305. The algorithm next determines whether or not Page packet is received immediately in the step 305. If Inquiry packet is received immediately (yes), then the algorithm proceeds to the step 307 to complete connection establishment; to set state=CONNECTED and set the node to be Slave. If not (no), the algorithm then proceeds to the step 308 and set state=Inquiry_SCAN to revert the step 303. The algorithm then proceeds to the step 308 to determine whether or not Master asks the Slave to become Proxy-Slave. If so (yes), the algorithm proceeds to the step 309 to set the node to be Proxy-Slave. If not (no), the algorithm proceeds to the step 310 and the Proxy-Slave is not paged and the state is set to be INQUIRY_SCAN end goes back to the step 303. These procedures are executed whenever the node is a Slave-designate as shown in the steps 303–310. FIG. 4 shows a sample pseudo-code for executing the procedure shown in FIG. 3. Summarizing the procedure shown in FIG. 3, if on sending an inquiry response, the inquirer does not page it and does not establish a connection, then it goes back to the scan state. However, if the inquirer connects to it, then it becomes a Slave of the Master, i.e., clusterheaded by its Inquirer, and steps scanning. If the Master/Master-designate directs it to become a Proxy-slave, it goes into scan for the Super-master election.

Figure 5:
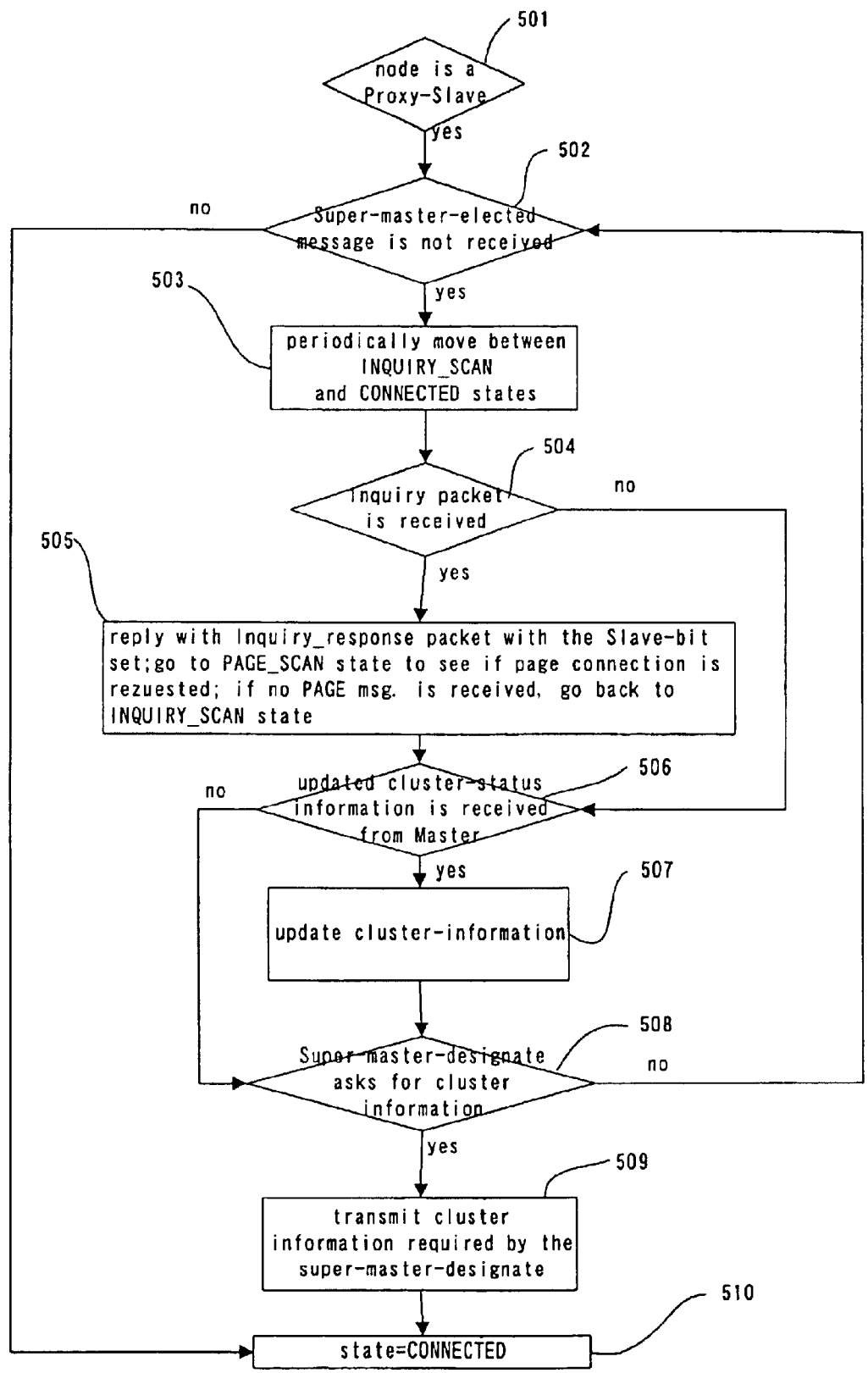
FIG. 5 a flowchart of a process executed in a Proxy-slave-designate.

FIG. 5 shows a flowchart of the algorithm executed by a Proxy-Slave. The essential feature of the Proxy-slave is periodically to alternate the state thereof between INQUIRY_SCAN and CONNECTED states. The amount of time spent in the CONNECTED state may be much smaller than that in the scan state. The purpose is to be able to get up-to-date information about the status of the cluster (number of nodes in it, time-out, etc.) from the Master. After responding to every inquiry, the Proxy-slave also waits for a page message to get connected to the inquirer. If a Super-master-designate asks for cluster information, then it temporarily becomes a bridge between its home cluster and the one formed between itself and the Super-master-designate. Once a Super-master-elected message is received, it goes to the CONNECTED state in its home cluster.

The above process is executed according to the flowchart shown in FIG. 5. The algorithm first determines that the node is a Proxy-Slave in the step 501 and the node knows the Master ID in this step. This node is in CONNECTED state. The algorithm then proceeds to the step 502 and determines whether or not a Super-master-elected message is not received. If so (yes), the algorithm proceeds to the step 503 and periodically alters the state of the Proxy-Slave between INQUIRY_SCAN and CONNECTED states. The time duration of the INQUIRY_SCAN may be much longer than the time duration of the CONNECTED state. The algorithm next proceeds to the step 504 and determines whether or not Inquiry message in the packet is received. In this stage, the state of the Proxy-Slave is in INQUIRY_SCAN.

If so (yes), the algorithm then proceeds to the step 505 and reply with Inquiry_response in the packet including the Slave-bit set and jumps to PAGE_SCAN state to determines whether or not the page connection is requested. If no Page message is received, the algorithm goes back to INQUIRY_SCAN state. If not (no), the algorithm then proceeds to the step 506 and determines whether updated cluster status information is received from the Master. If so (yes), the algorithm updates the cluster-information in the step 507. If not (no), the algorithm determines whether or not the Super-master-designate asks for cluster information in the step 508. In this state, the proxy-Slave temporarily becomes a bridge between own clusters thereof and a bridge between the Proxy-Slave and the Super-master-designate. If so (yes), the algorithm further proceeds to the step 509 and transmits the cluster information required by the Super-master-designate. Among other things this cluster information can include Ids of all the Slaves in the cluster. If not (no), the algorithm goes back to the step 502 until the Super-master-election is completed. The algorithm exit the while-loop to as to set state=CONNECTED in the step 510 when the determination in the step 502 is no. A sample pseudo-code for executing the procedure in FIG. 5 is shown in FIG. 6.

Figure 7:
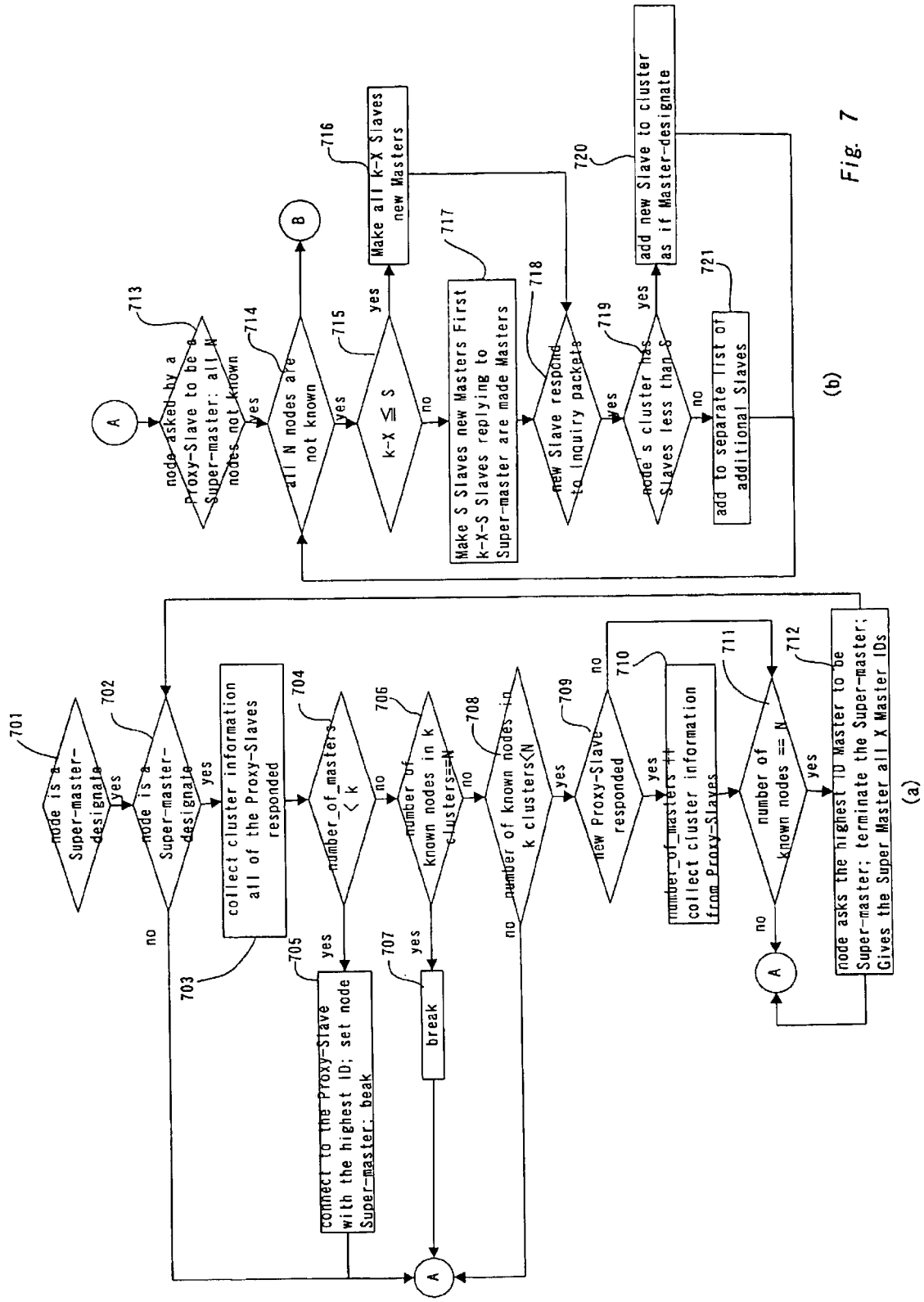
FIGS. 7(a), (b) shows the flowchart of a process executed for Super-Master-election.

FIG. 7 shows a flowchart of the algorithm executed by the Super-master-designate. The algorithm executed by the Super-master-designate first determines that the node is a Super-master-designate in the step 701 and the algorithm proceeds to the while-loop started from the step 702. If the nods is a Super-master-designate (yes), the algorithm proceeds to the step 703 and collect cluster information from all of the Proxy-Slaves which responded. In the step 702, in order to make a connection to the Proxy-Slave, the Super-master-designate transmit the Inquiry packet so that the algorithm jumps to PAGE_SCAN soon after responding and the connection has been established. The algorithm next proceeds to the step 704 and determines whether or not number_of_masters is less than k. If so (yes), since SUPERM_TO has occurred, then the algorithm proceeds to the atop 705 and makes a connection to the Proxy-slave having the highest ID and sets the node to be Super-master and the algorithm reverts to the step 713.

If not (no), the algorithm shown in FIG. 7(a) further proceeds to the step 706 for executing the case number_of_masters=k (actual number-of-masters>k). In the step 706, the algorithm determines whether or not the total number of known nodes in k clusters is equal to N. If so (yes), the algorithm breaks at the step 707.

If not (no), the algorithm shown in FIG. 7(a) then proceeds to the atop 708 and determines whether or not the total number of known nodes in k clusters is less than N. If yes (so), the algorithm shown in FIG. 7(a) further proceeds to the step 709 and determines whether or not new Proxy-Slaves respond to Inquiry packets. If no (yes), the algorithm further proceeds to the step 710 and sets numbers_of_masters to be ++ and collects clusters information from the new Proxy-Slaves. If not (no), the algorithm further proceeds to the step 711 and determines whether the total number of known nodes==N. If so (yes), the algorithm proceeds to the stop 712 and the nodes set the highest ID Master to be Super-master and also instructs the Super-master to terminate and gives the Super-master all X Master IDs and the algorithm revolts to the step 713. The algorithm shown in FIG. 7(a) exit the loop started from the atop 702 until the mode is not the Super-master-designate.

Figure 8:
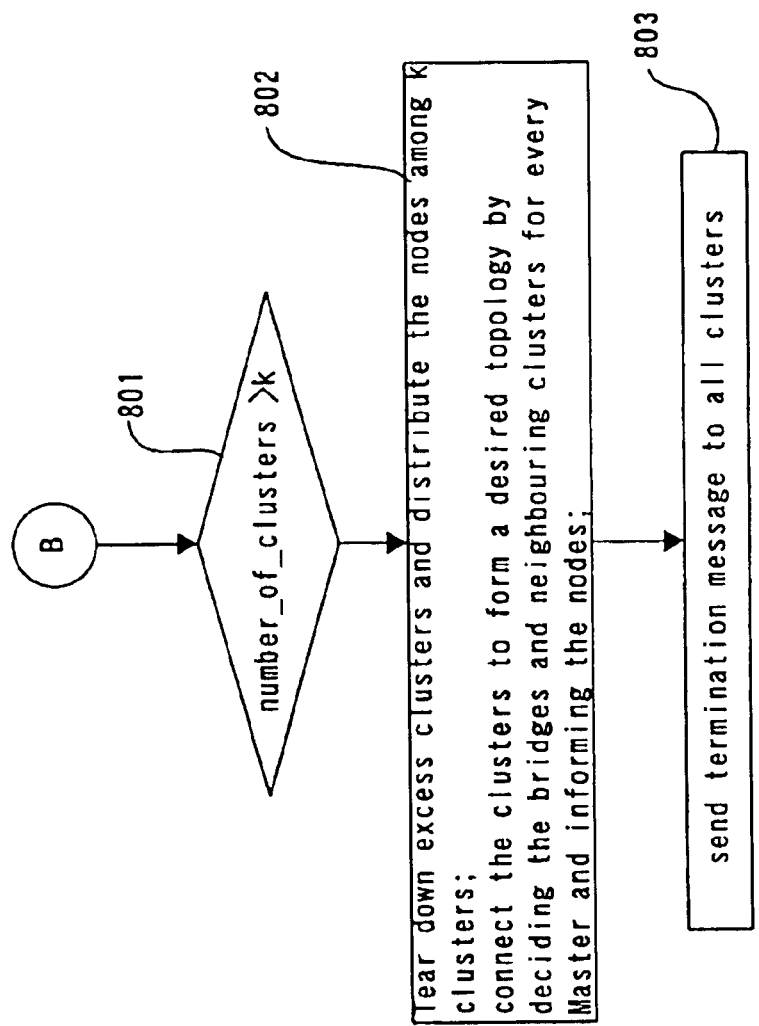
FIG. 8 shows an algorithm executed for Super-Master-election subsequent to the procedure shown in FIG. 7.

The algorithm executed by the Super-master-designate following to FIG. 7(a) proceeds to FIG. 7(b) and the algorithm further determines whether the node has been asked by the Proxy-Slave to be a Super-master and all N nodes are not known in the step 713. If so (yes), the algorithm further determines whether or not all of the N nodes is not known in the step 714. If so (yes), further the algorithm determines whether (k−X) is less than or equal to or less than S in the step 715 and if so (yes), the algorithm makes all (k−X) slaves to be new Masters in the step 716 which then collect the remaining nodes. If not (no), the algorithm makes S slaves new Masters which collect new Slave-designates in the step 717; the first (k−X−S) Slave-designates replying to it are made to be Masters. The algorithm further proceeds to the step 718 and determines whether or not the new Slave-designates respond to Inquiry packets. If so (yes), these are orphan Slave-designates which are not part of any cluster, and the algorithm further determines whether or not the node's cluster has numbers of Slaves less than S in the step 719. If so (yes), the algorithm adds a new Slave to the cluster as the Master-designate does in the step 720, end if not (no), the algorithm adds to a separate list of additional slaves in the step 721 and the algorithm goes back to the loop started from the step 714. If the determination in the step 714 is no, the algorithm further determines whether the number_of_clusters is larger than k in the step 801 shown in FIG. 8, and if so (yes), the algorithm tears down excess clusters and distribute the nodes among k clusters; connects the clusters to form a desired topology by deciding the bridges and neighboring clusters for every Masters; and informing the nodes in the step 802. The algorithm further proceeds to the step 803 and transmits a termination message to all clusters (and hence all nodes). A sample pseudo-code is shown in FIG. 9.

Figure 10:
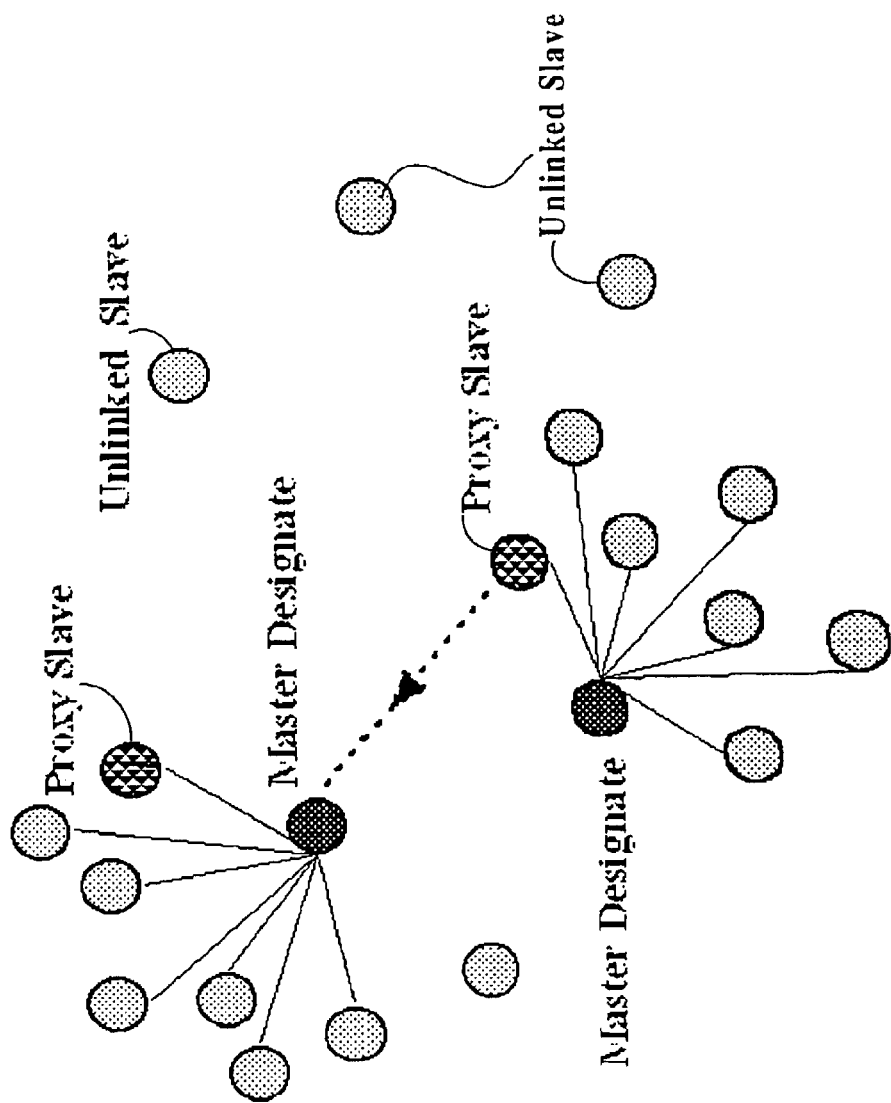
FIG. 10 shows a randomized cluster formation algorithm for X<k.
Figure 11:
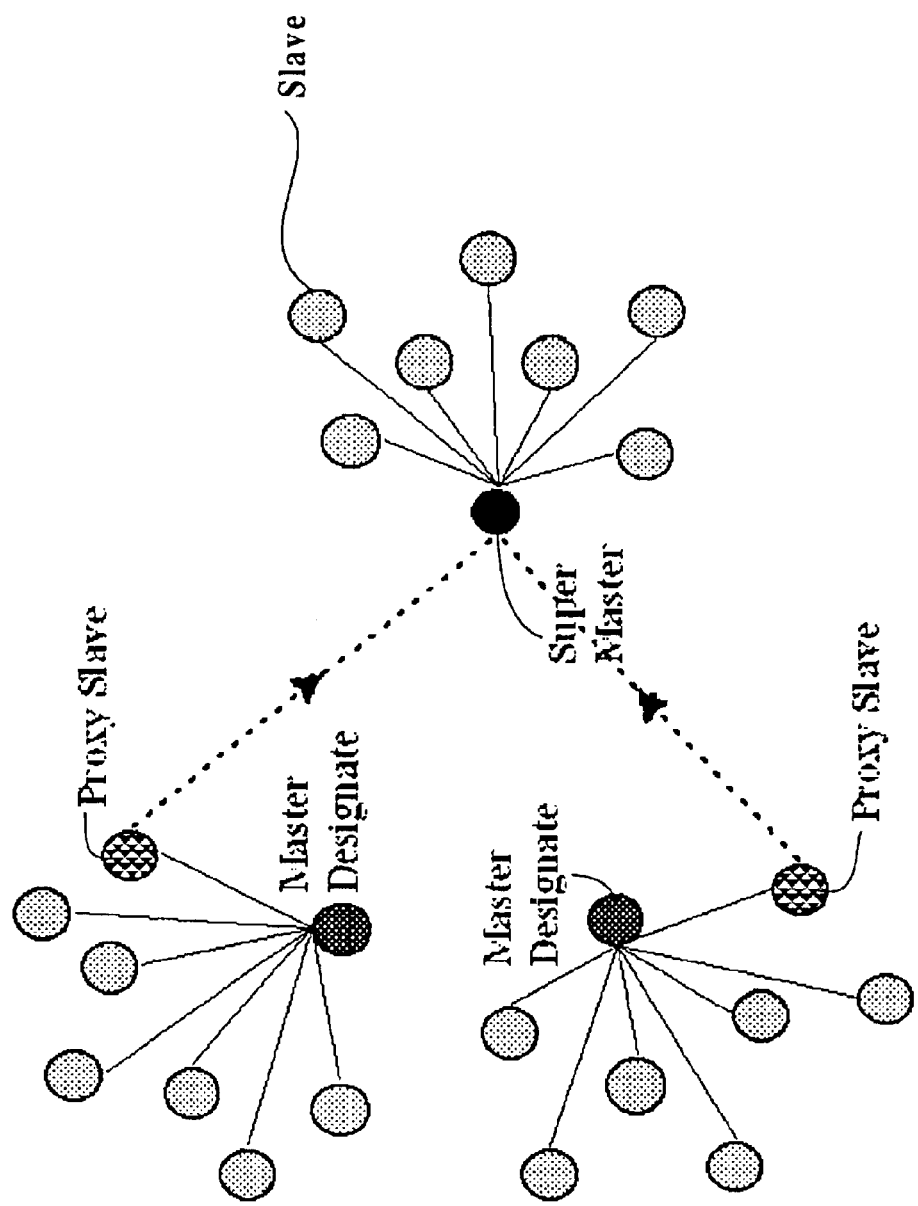
FIG. 11 shows a randomized cluster formation algorithm for X=k.
Figure 12:
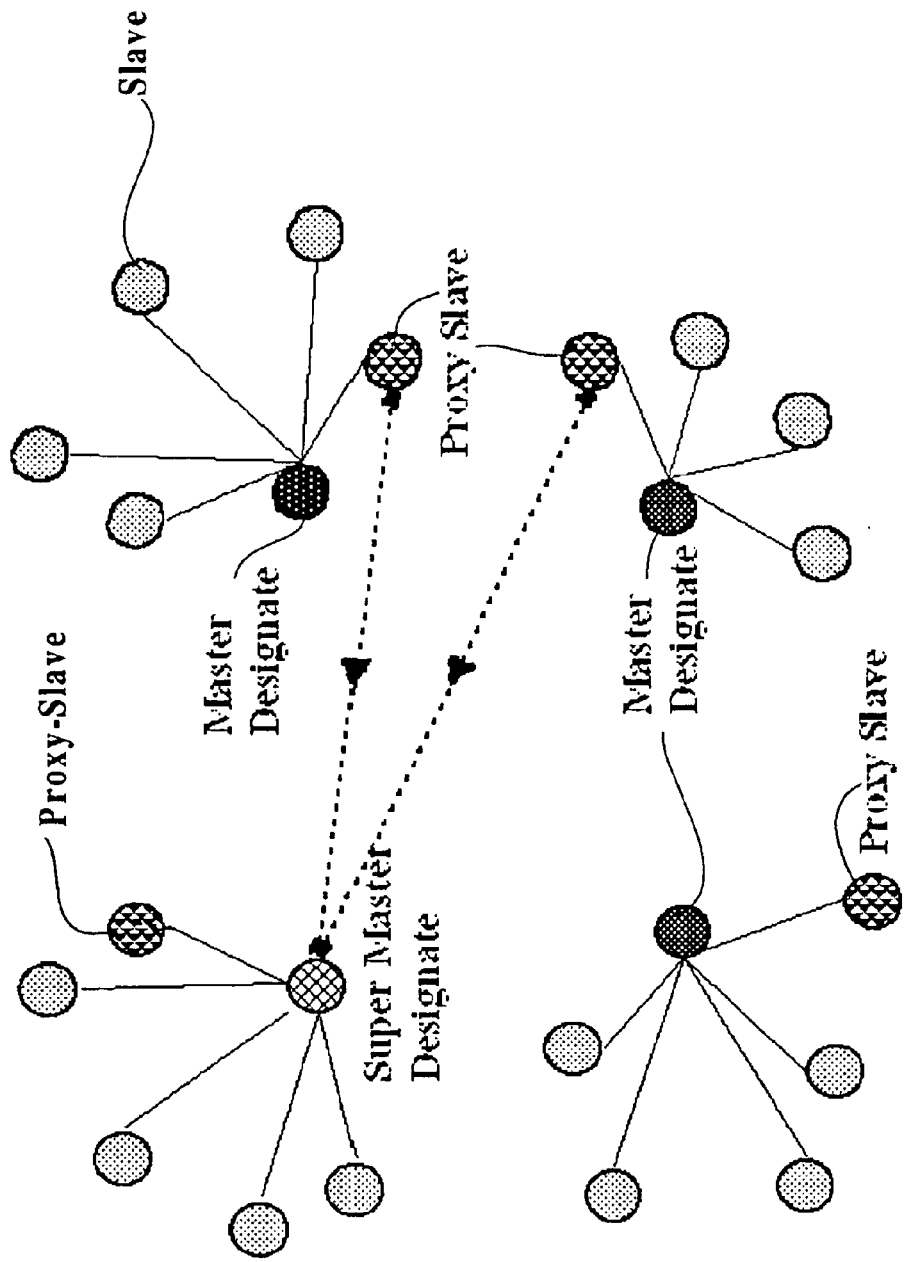
FIG. 12 shows a randomized cluster formation algorithm for X>k

FIGS. 10~12 show the graphical representation of the relation of the nodes designated the Master, the Slave, the Proxy-Slave, and the Super-master. If the actual number of Master-designates/Masters is less than the optimal number of clusters, i.e., X≦k, then the following procedure is used as shown in FIG. 10 and FIG. 11. A Super-master-designate collects cluster information from each Proxy-slave that has replied to it. If X<k, clearly, the SUPERM_TO has occurred and hence it connects to the Proxy-slave with suitable selected ID, such as the highest ID. It then instructs this Proxy-slave's Master (through the Proxy-slave) to become the Super-master. Since the cluster information obtained up to now does not cover all the nodes, the Super-master continues to scan to collect the remaining nodes. If k−X is less than the number of Slaves, S with the Super-master, then k−X of its Slaves are made Masters, which can then collect inquiry responses from the Slave-designates. If k−X is greater than the number of Slaves in the cluster, then the Super-master makes all its S Slaves as Masters, and keeps inquiring for Slave-designates. It also makes the first k−x−S Slave-designates that it now catches as Masters. All the new Masters along with the Super-master collect Slaves just like Master-designates.

If the actual number of Masters, X, is greater than the optimal number, k, then the Super-master-designate knows this since its cluster would not be full as shown in FIG. 12. Each Super-master-designate inquires to collect responses from all clusters. When the total number adds up to the number of nodes in the network, then the Master of the Proxy-slave with the highest ID is declared the Super-master, and all the cluster information is sent to the Super-master-designate. Since exactly k clusters are needed, the extra clusters are tom down and the nodes distributed among the k largest clusters. When the Super-master has information about all the nodes, all the clusters are informed about the identity of the Super-master and the algorithm terminates.

It should be noted that the messages used towards the end carry a lot of information, but may be sent in a relatively short time since when these messages are used, the Super-master knows the ID and Clock of all the nodes.

At this point, since a single node knows about all the nodes in the ad hoc network, any centralized algorithm can be used to connect the clusters using bridge nodes to form the desired topology. For example, in order to form a completely connected network, where each cluster is connected to every other cluster, the Super-master selects one bridge node between any pair of clusters, and sends the messages to the Masters.

The above algorithm may be realized by a program coded by any suitable programing language such as C language, and the program may be stored in a suitable storage means such as, for example, a floppy disk, a hard disk, a magnetic tape, a CD-ROM, DVD, an optical-magnetic disk, etc.

The present invention has been explained using the algorithm executed in each node as the best mode, however the present invention also contemplates the Bluetooth System itself, a method executed by the algorithm described above, and a program product recorded in a suitable storage means described above.

It may be appreciated to a person skilled in the art that many modification, omission, and other embodiments may be possible according to teachings of the present invention without departing from the scope and spirit of the present invention.

What is claimed is:

1. A method for organizing a set of nodes into a minimum number of connected clusters in a wireless transmission system, said method comprising steps of:

using of bits in packets used in the initial stages of a device discovery procedure, to include information relating to a state of said nodes during the initial stages of the procedure;

setting parameters in the procedure for device discovery to achieve a separation of the nodes into those in a transmit-state and a receive-state;

defining Master-designates among said nodes through a statistical procedure and defining remaining nodes Slave-designates; and defining clusters including said Master-designates and at least one said Slave-designate, wherein said Slave-designate continuously scans for an inquiry message transmitted from said Master-designate and said Slave-designate transmits an inquiry response to said Master-designate upon receiving said inquiry message to establish a connection between said Master-designate and said Slave-designate, wherein at least one Super-master-designate is selected from said Master-designates and at least one Proxy-Slave is selected for each Master-designate.

2. A method for organizing a set of nodes into a minimum number of connected clusters in a wireless transmission system, said method comprising steps of:

using of bits in packets used in the initial stages of a device discovery procedure, to include information relating to a state of said nodes during the initial stages of the procedure;

setting parameters in the procedure for device discovery to achieve a separation of the nodes into those in a transmit-state and a receive-state;

defining Master-designates among said nodes through a statistical procedure and defining remaining nodes as Slave-designates; and defining clusters including said Master-designates and at least one said Slave-designate, wherein said Slave-designate continuously scans for an inquiry message transmitted from said Master-designate and said Slave-designate transmits an inquiry response to said Master-designate upon receiving said inquiry message to establish a connection between said Master-designate and said Slave-designate, wherein at least one Super-master-designate is selected from said Master-designates and at least one Proxy-Slave is selected for each Master-designate, said method further comprising a step of communicating between said Super-master-designate of one of said clusters and said Proxy-Slave of other of said clusters such that said Super-master-designate collects information of said clusters from each of said Proxy-Slave having an predetermined ID.

3. The method according to the claim 1, wherein said bits in said packets are transmitted in initial stages of discovery of nodes and include information to convey states of said nodes.

4. A method for organizing a set of nodes into a minimum number of connected clusters in a wireless transmission system, said method comprising steps of:

using of bits in packets used in the initial stages of a device discovery procedure, to include information relating to a state of said nodes during the initial stages of the procedure;

setting parameters in the procedure for device discovery to achieve a separation of the nodes into those in a transmit-state and a receive-state;

defining Master-designates among said nodes through a statistical procedure and defining remaining nodes as Slave-designates; and defining clusters including said Master-designates and at least one said Slave-designate, wherein said Slave-designate continuously scans for an inquiry message transmitted from said Master-designate and said Slave-designate transmits an inquiry response to said Master-designate upon receiving said inquiry message to establish a connection between said Master-designate and said Slave-designate, wherein at least one Super-master-designate is selected from said Master-designates and at least one Proxy-Slave is selected for each Master-designate, and wherein an interval of an inquiry scan is close to a duration of a scan window for said inquiry scan.

5. A method for organizing a set of nodes into a minimum number of connected clusters in a wireless transmission system, said method comprising steps of:

using of bits in packets used in the initial stages of a device discovery procedure, to include information relating to a state of said nodes during the initial stages of the procedure;

setting parameters in the procedure for device discovery to achieve a separation of the nodes into those in a transmit-state and a receive-state;

defining Master-designates among said nodes through a statistical procedure and defining remaining nodes as Slave-designates; and defining clusters including said Master-designates and at least one said Slave-designate, wherein said Slave-designate continuously scans for an inquiry message transmitted from said Master-designate and said Slave-designate transmits an inquiry response to said Master-designate upon receiving said inquiry message to establish a connection between said Master-designate and said Slave-designate, wherein said bits in said packet include information selected from the group consisting of numbers of responses received by said node by a predetermined period, numbers of said nodes included in said cluster, whether or not said node transmitting said inquiry response is included in said cluster, and whether or not said node transmitting said inquiry response is said Master-designate.

6. A method for organizing a sat of nodes into a minimum number of connected clusters in a wireless transmission system, said method comprising stops of:

using of bits in packets used in the initial stages of a device discovery procedure, to include information relating to a state of said nodes during the initial stages of the procedure;

setting parameters in the procedure for device discovery to achieve a separation of the nodes into those in a transmit-state and a receive-state;

defining Master-designates among said nodes through a statistical procedure and defining remaining nodes as Slave-designates; and defining clusters including said Master-designates and at least one said Slave-designate, wherein said Slave-designate continuously scans for an inquiry message transmitted from said Master-designate and said Slave-designate transmits an inquiry response to said Master-designate upon receiving said inquiry message to establish a connection between said Master-designate and said Slave-designate, wherein at least one Super-master-designate is selected from said Master-designates and at least one Proxy-Slave is selected for each Master-designate, and wherein said statistical procedure includes Bermoulli trials executed by each node.

7. The method according to the claim 1, wherein said wireless transmission system is a Bluetooth System.

8. A system for organizing a set of nodes into a minimum number of connected clusters of bounded size in a wireless transmission system, said system comprising:

means for using of bits in packets used in the initial stages of a device discovery procedure, to include information relating to a state of said nodes during the initial stages of the procedure;

means for setting parameters in the procedure for device discovery to achieve a separation of the nodes into those in a transmit-state and a receive-state;

means for defining a Master-designate among said nodes through a statistical procedure and defining remaining nodes as a Slave-designate; and means for defining a cluster including said Master-designate and at least one said Slave-designate, wherein said Slave-designate continuously scans for an inquiry message transmitted from said Master-designate and said Slave-designate transmits an inquiry response to said Master-designate upon receiving said inquiry message to establish a connection between said Master-designate and said Slave-designate, wherein at least one Super-master-designate is selected from said Master-designates and at least one Proxy-Slave is selected for each Master-designate.

9. A system for organizing a set of nodes into a minimum number of connected clusters of bounded size in a wireless transmission system, said system comprising:

means for using of bits in packets used in the initial stages of a device discovery procedure, to include information relating to a state of said nodes during the initial stages of the procedure;

means for setting parameters in the procedure for device discovery to achieve a separation of the nodes into those in a transmit-state and a receive-state;

means for defining a Master-designate among said nodes through a statistical procedure and defining remaining nodes as a Slave-designate; and means for defining a cluster including said Master-designate and at least one said Slave-designate, wherein said Slave-designate continuously scans for an inquiry message transmitted from said Master-designate and said Slave-designate transmits an inquiry response to said Master-designate upon receiving said inquiry message to establish a connection between said Master-designate and said Slave-designate, wherein at least one Super-master-designate is selected from said Master-designate and at least one Proxy-Slave is selected for each Master-designate, said system further comprising means for communicating between said Super-master-designate of one of said clusters and said Proxy-Slave of other of said clusters such that said Super-master-designate collects information of said clusters from each of said Proxy-Slave having a predetermined ID.

10. The system according to the claim 8, wherein said bits in said packets are transmitted in initial stages of discovery of nodes and include information to convey states of said nodes.

11. A system for organizing a set of nodes into a minimum number of connected clusters of bounded size in a wireless transmission system, said system comprising:

means for using of bits in packers used in initial stages of a device discovery procedure, to include information relating to a state of said nodes during the initial stages of the procedure;

means for setting parameters in the procedure for device discovery to achieve a separation of the nodes into those in a transmit-state and a receive-state;

means for defining a Master-designate among said nodes through a statistical procedure and defining remaining nodes as a Slave-designate; and means for defining a cluster including said Master-designate and at least one said Slave-designate, wherein said Slave-designate continuously scans for an inquiry message transmitted from said Master-designate and said Slave-designate transmits an inquiry response to said Master-designate upon receiving said inquiry message to establish a connection between said Master-designate and said Slave-designate, wherein at least one Super-master-designate is selected from said Master-designates and at least one Proxy-Slave is selected for each Master-designate, and wherein an interval of an inquiry scan is close to a duration of a scan window for said inquiry scan.

12. A system for organizing a set of nodes into a minimum number of connected clusters of bounded size in a wireless transmission system, said system comprising:

means for using of bits in packets used in the initial stages of a device discovery procedure, to include information relating to a state of said nodes during the initial stages of the procedure;

means for setting parameters in the procedure for device discovery to achieve a separation of the nodes into those in a transmit-state and a receive-state;

means for defining a Master-designate among said nodes through a statistical procedure and defining remaining nodes as a Slave-designate; and means for defining a cluster including said Master-designate and at least one said Slave-designate, wherein said Slave-designate continuously scans for an inquiry message transmitted from said Master-designate and said Slave-designate transmits an inquiry response to said Master-designate upon receiving said inquiry message to establish a connection between said Master-designate and said Slave-designate, wherein said bits in said packets include information selected from the group consisting of numbers of responses received by said node by a predetermined period, numbers of said nodes included in said cluster, whether or not said node transmitting said inquiry response is included in said cluster, and whether or not said node transmitting said inquiry response is said Master-designate.

13. A system for organizing a set of nodes into a minimum number of connected clusters of bounded size in a wireless transmission system, said system comprising:

means for using of bits in packets used in the initial stages of a device discovery procedure, to include information relating to a state of said nodes during the initial stages of tire procedure;

means for setting parameters in the procedure for device discovery to achieve a separation of the nodes into those in a transmit-state and a receive-state;

means for defining a Master-designate among said nodes through a statistical procedure and defining remaining nodes as a Slave-designate; and means for defining a cluster including said Master-designate and at least one said Slave-designate, wherein said Slave-designate continuously scans for an inquiry message transmitted from said Master-designate and said Slave-designate transmits an inquiry response to said Master-designate upon receiving said inquiry message to establish a connection between said Master-designate and said Slave-designate, wherein at least one Super-master-designate is selected from said Master-designates and at least one Proxy-Slave is selected for each Master-designate, and wherein said statistical procedure includes Bernoulli trials executed by each node.

14. The system according to the claim 8, wherein said wireless transmission system is a Bluetooth System.

15. The system according to the claim 14, wherein nodes which are connected as slaves in a piconet carry on a node discovery on behalf or in addition to said Master-designate such that a piconet/scatternet for the Bluetooth system is formed.

16. A computer program product having a computer readable medium having a computer program recorded therein for organizing a set of nodes into a minimum number of connected clusters of bounded size in a wireless transmission system, said computer program product including:

computer program code means for using of bits in packets used in an initial stages of a device discovery procedure, to include information relating to a state of said nodes during the initial stages of the procedure;

computer program code means for setting parameters in the procedure for device discovery to achieve a separation of the nodes into those in a transmit-state and a receive-state;

computer program code means for defining a Master-designate among said nodes through a statistical procedure and defining remaining nodes as Slave-designates; and computer program code means for defining a cluster including said Master-designate and at least one said Slave-designate, wherein said Slave-designate continuously scans for an inquiry message transmitted from said Master-designate and said Stave-designate transmits an inquiry response to said Master-designate upon receiving said inquiry message to establish a connection between said Master-designate and said Slave-designate, wherein at least one Super-master-designate is selected from said Master-designates and at least one Proxy-Slave is selected for each Master-designate.

17. A computer program product having a computer readable medium having a computer program recorded therein for organizing a set of nodes into a minimum number of connected clusters of bounded size in a wireless transmission system, said computer program product including;

computer program code means for using of bits in packets used in an initial stages of a device discovery procedure, to include information relating to a state of said nodes during the initial stages of the procedure;

computer program code means for setting parameters in the procedure for device discovery to achieve a separation of the nodes into those in a transmit-state and a receive-state;

computer program code means for defining a Master-designate among said nodes through a statistical procedure and defining remaining nodes as Slave-designates; and computer program code means for defining a cluster including said Master-designate and at least one said Slave-designate, wherein said Slave-designate continuously scans for an inquiry message transmitted from said Master-designate and said Stave-designate transmits an inquiry response to said Master-designate upon receiving said inquiry message to establish a connection between said Master-designate and said Slave-designate, wherein at least one Super-master-designate is selected from said Master-designates and at one Proxy-Slave is selected for each Master-designate, said computer program further comprising means for communicating between said Super-master-designate of one of said clusters and said Proxy-Slave of other of said clusters such that said Super-master-designate collects information of said clusters from each of said Proxy-Slave having a predetermined ID.

18. The computer program product according to the claim 16, wherein said bits in said packets are transmitted in initial stages of discovery of nodes and include information to convey states of said nodes.

19. A computer program product having a computer readable medium having a computer program recorded therein for organizing a set of nodes into a minimum number of connected clusters of bounded size in a wireless transmission system, said computer program product including:

computer program code means for using of bits in packets used in initial stages of a device discovery procedure, to include information relating to a state of said nodes during the initial stages of the procedure;

computer program code means for setting parameters in the procedure for device discovery to achieve a separation of the nodes into those in a transmit-state and a receive-state;

computer program code means for defining a Master-designate among said nodes through a statistical procedure and defining remaining nodes as Slave-designates; and computer program code means for defining a cluster including said Master-designates and at least one said Slave-designate, wherein said Slave-designate continuously scans for an inquiry message transmitted from said Master-designate and said Slave-designate transmits an inquiry response to said Master-designate upon receiving said inquiry message to establish a connection between said Master-designate and said Slave-designate, wherein at least one Super-master-designate is selected from said Master-designates and at least one Proxy-Slave is selected for each Master-designate; and wherein an interval of an inquiry scan is close to a duration of a scan window for said inquiry scan.

20. A computer program product having a computer readable medium having a computer program recorded therein for organizing a set of nodes into a minimum number of connected clusters of bounded size in a wireless transmission system, said computer program product including:

computer program code means for using of bits in packets used in au initial stages of a device discovery procedure, to include information relating to a state of said nodes during the initial stages of the procedure;

computer program code means for setting parameters in the procedure for device discovery to achieve a separation of the nodes into those in a transmit-state and a receive-state;

computer program code means for defining a Master-designate among said nodes through a statistical procedure and defining remaining nodes as Slave-designates; and computer program code means for defining a cluster including said Master-designate and at least one said Slave-designate, wherein said Slave-designate continuously scans for an inquiry message transmitted from said Master-designate and said Slave-designate transmits an inquiry response to said Master-designate upon receiving said inquiry message to establish a connection between said Master-designate and said Slave-designate, wherein said bits in packets include information selected from the group consisting of numbers of responses received by said node by a predetermined period, numbers of said nodes included in said cluster, whether or not said node transmitting said inquiry response is included in said cluster, and whether or not said node transmitting said inquiry response is said Master-designate.

21. A computer program product having a computer readable medium having a computer program recorded therein for organizing a set of nodes into a minimum number of connected clusters of bounded size in a wireless transmission system, said computer program product including:

computer program code means for using of bits in packets used in an initial stages of a device discovery procedure, to include information relating to a state of said nodes during the initial stages of the procedure;

computer program code means for setting parameters in the procedure for device discovery to achieve a separation of the nodes into those ma transmit-state and a receive-state;

computer program code means for defining a Master-designate among said nodes through a statistical procedure and defining remaining nodes as Slave-designate; and computer program code means for defining a cluster including said Master-designate and at least one said Slave-designate, wherein said Slave-designate continuously scans for an inquiry message transmitted from said Master-designate and said Slave-designate transmits an inquiry response to said Master-designate upon receiving said inquiry message to establish a connection between said Master-designate and said Slave-designate, wherein at least one Super-master-designate is selected from said Master-designates and at least one Proxy-Slave is selected for each Master-designate, and wherein said statistical procedure includes Bermoulli trials executed by each node.

22. The computer program product according to the claim 16, wherein said wireless transmission system is a Bluetooth System.

* * * * *